(12) United States Patent
Bruch

(10) Patent No.: US 9,221,483 B1
(45) Date of Patent: Dec. 29, 2015

(54) TRANSPORT DOLLY

(71) Applicant: Kevin Lee Bruch, Sedalia, CO (US)

(72) Inventor: Kevin Lee Bruch, Sedalia, CO (US)

( * ) Notice: Subject to any disclaimer, the term of this patent is extended or adjusted under 35 U.S.C. 154(b) by 0 days.

(21) Appl. No.: 14/599,955

(22) Filed: Jan. 19, 2015

(51) Int. Cl.
*B62B 1/26* (2006.01)
(52) U.S. Cl.
CPC ...................................... *B62B 1/268* (2013.01)
(58) Field of Classification Search
CPC .............. B62B 1/10; B62B 1/12; B62B 1/14; B62B 3/00; B62B 3/002; B62B 3/02; B62B 3/04; B62B 2203/44; B62B 1/268; B62B 3/108
USPC ......... 280/79.11, 79.2, 79.3, 79.4, 79.5, 79.6, 280/79.7; 269/17, 133, 237
See application file for complete search history.

(56) References Cited

U.S. PATENT DOCUMENTS

| | | | | |
|---|---|---|---|---|
| 4,270,741 A * | 6/1981 | Hurst | ........................ | B25B 5/00 269/17 |
| 4,695,067 A * | 9/1987 | Willey | ...................... | B62B 1/14 269/237 |
| 5,318,316 A * | 6/1994 | Shurtleff | ................. | B62B 1/268 269/133 |
| 6,663,123 B1 * | 12/2003 | Kovacs | ................... | B62B 1/142 269/133 |
| 8,162,329 B1 * | 4/2012 | Openshaw | .............. | B62B 1/268 280/47.131 |

* cited by examiner

*Primary Examiner* — John Walters
(74) *Attorney, Agent, or Firm* — Plager Schack LLP

(57) ABSTRACT

A transport dolly is configured to move cargo. The transport dolly includes a first L-shaped support and a second L-shaped support attached to a hinge. A first wheel assembly is attached to the first L-shaped support. A second wheel assembly is attached to the second L-shaped support. In a first mode of operation the hinge is collapsed such that a first upper surface on the first L-shaped support is immediately adjacent to a second first L-shaped support. In a second mode of operation, the hinge is opened such that the first upper surface is distant from the second upper surface. In a third mode of operation, the cargo is placed on first L-shaped support and the second L-shaped support such that the first L-shaped support and the second L-shaped support contact three sides of the cargo.

3 Claims, 5 Drawing Sheets

TRANSPORT DOLLY

BACKGROUND

The embodiments herein relate generally to devices which provide a mechanical advantage for moving goods. In particular, embodiments of the disclosed invention can be useful for transporting doors and windows.

SUMMARY

A transport dolly is configured to move cargo. The transport dolly includes a first L-shaped support and a second L-shaped support attached to a hinge. A first wheel assembly is attached to the first L-shaped support. A second wheel assembly is attached to the second L-shaped support. In a first mode of operation the hinge is collapsed such that a first upper surface on the first L-shaped support is immediately adjacent to a second first L-shaped support. In a second mode of operation, the hinge is opened such that the first upper surface is distant from the second upper surface. In a third mode of operation, the cargo is placed on first L-shaped support and the second L-shaped support such that the first L-shaped support and the second L-shaped support contact three sides of the cargo.

In some embodiments, a first pad can be mechanically coupled to the first L-shaped support with a first pad backing. The first pad increases a first coefficient of friction between the cargo and the first L-shaped support. A second pad can be mechanically coupled to the second L-shaped support with a second pad backing wherein the second pad increases a second coefficient of friction between the cargo and the second L-shaped support.

In some embodiments, the first wheel assembly can include a first L-shaped support washer mechanically coupled to first L-shaped support. A first wheel can be mechanically coupled to a first L-shaped support washer with a first axel bolt. The first axel bolt is further secured to a first wheel with a first axel washer and a first lock nut. The second wheel assembly can further comprise a second L-shaped support washer mechanically coupled to second L-shaped support. A second wheel can be mechanically coupled to a second L-shaped support washer with a second axel bolt. The second axel bolt can be further secured to a second wheel with a second axel washer and a second lock nut.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
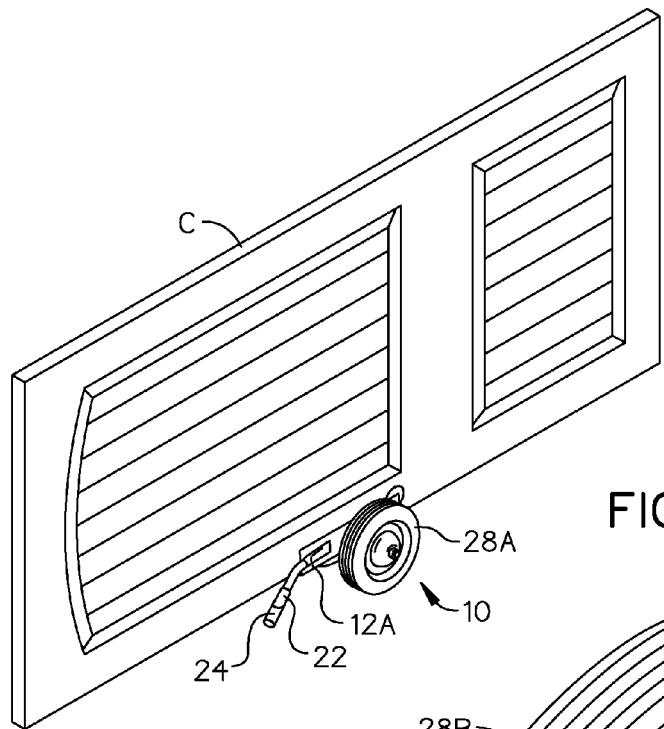
FIG. 1 is a perspective view of an embodiment of the invention, shown in use.
Figure 2:
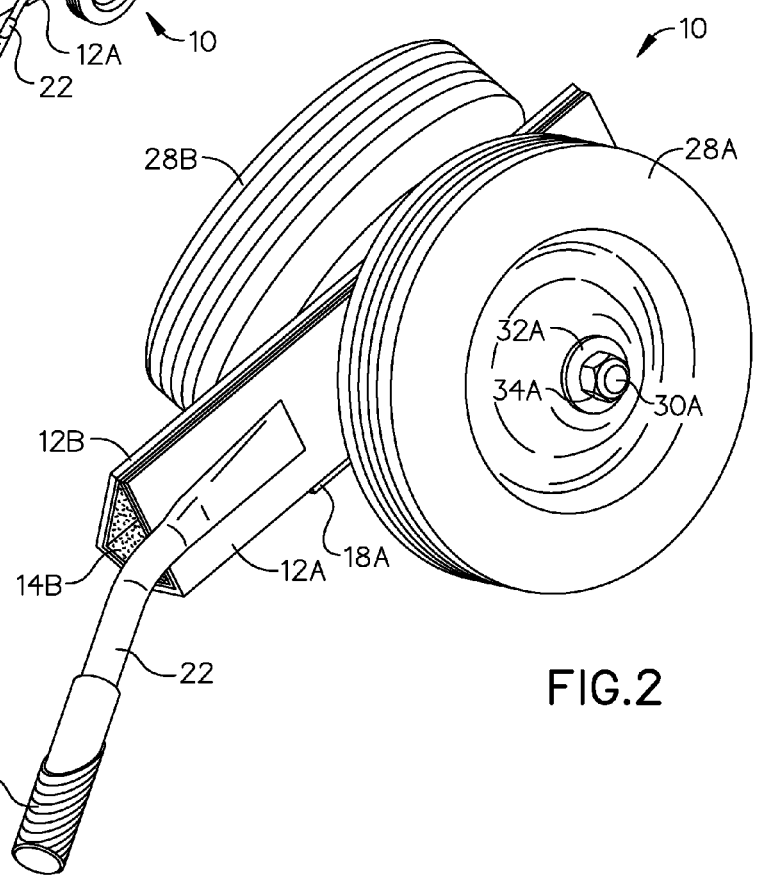
FIG. 2 is a perspective view of an embodiment of the invention.
Figure 3:
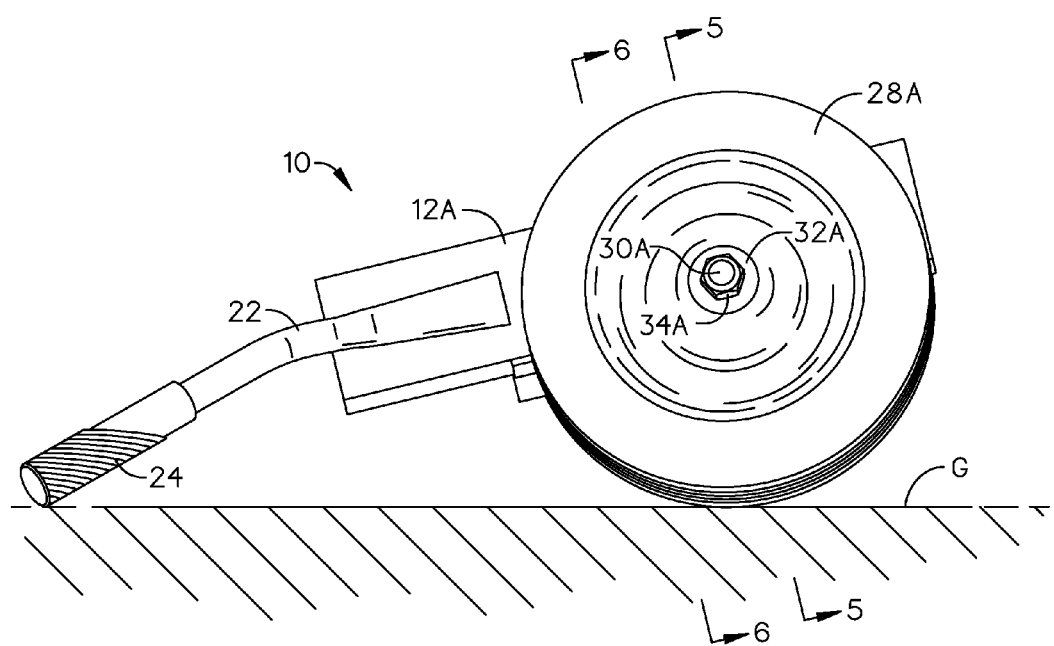
FIG. 3 is a side view of an embodiment of the invention, illustrating the use of the stand.
Figure 4:
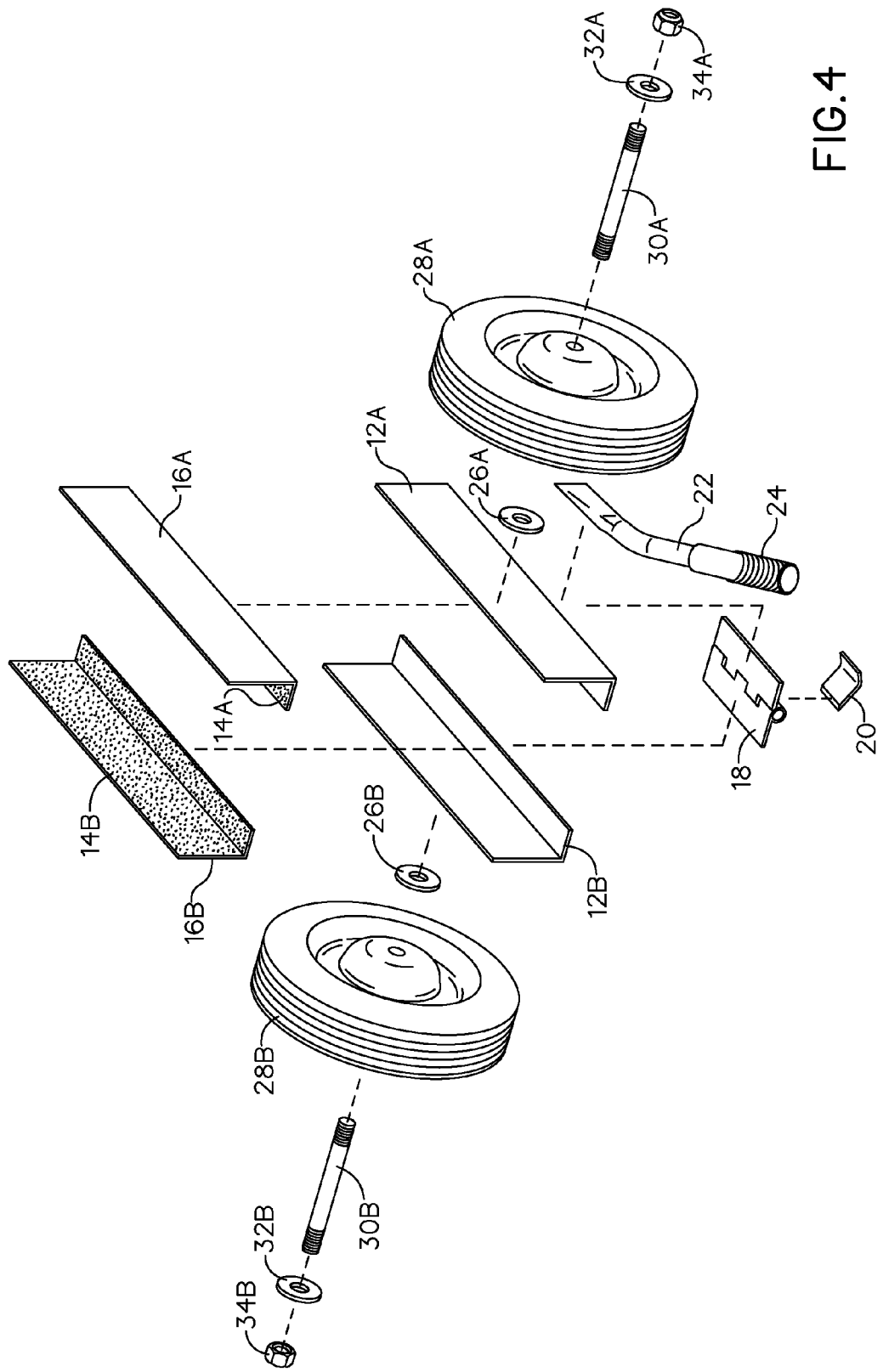
FIG. 4 is an exploded view of an embodiment of the invention.

By way of example, and referring to FIG. 1, one embodiment of transport dolly 10 is configured to maneuver cargo C (shown to be a door). Turning to FIGS. 1-4, transport dolly 10 comprises first L-shaped support 12A mechanically coupled to first pad 14A with first pad backing 16A. First L-shaped support 12 is mechanically coupled to hinge 18. Hinge 18 is further mechanically coupled to stop 20. Handle 22, is mechanically coupled to first L-shaped support 12A. Grip 24 is mechanically coupled to handle 22. First pad 14A increases a first coefficient of friction between the cargo and the first L-shaped support 12A.

First L-shaped support 12A is further mechanically coupled to a first wheel assembly which includes first L-shaped support washer 26A that is mechanically coupled to first L-shaped support 12A. First wheel 28A is mechanically coupled to first L-shaped support washer 26A with first axel bolt 30A. First axel bolt 30A is further secured to first wheel 28A with first axel washer 32A and first lock nut 34A.

Transport dolly 10 further comprises second L-shaped support 12B mechanically coupled to second pad 14B with second pad backing 16B. Second L-shaped support 12B is mechanically coupled to hinge 18. Hinge 18 is further mechanically coupled to stop 20.

Second L-shaped support 12B is further mechanically coupled to a second wheel assembly which includes second L-shaped support washer 26B that is mechanically coupled to second L-shaped support 12B. Second wheel 28B is mechanically coupled to second L-shaped support washer 26A with second axel bolt 30B. Second axel bolt 30B is further secured to second wheel 28B with second axel washer 32B and second lock nut 34B. Second pad 14B increases a second coefficient of friction between the cargo and the second L-shaped support 12B.

Each support has a horizontal arm mechanically coupled to a vertical arm. Typically the vertical arm is longer than the horizontal arm to maneuver something much larger than it is thick, such as the door represented by cargo C.

Figure 5:
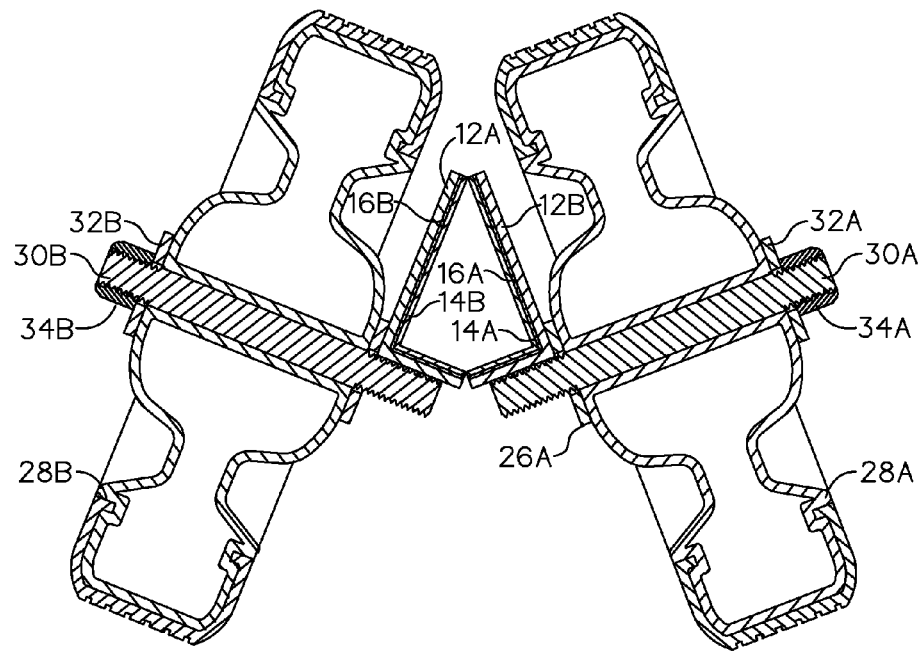
FIG. 5 is a section view of an embodiment of the invention, taken along line 5-5 in FIG. 2.
Figure 6:
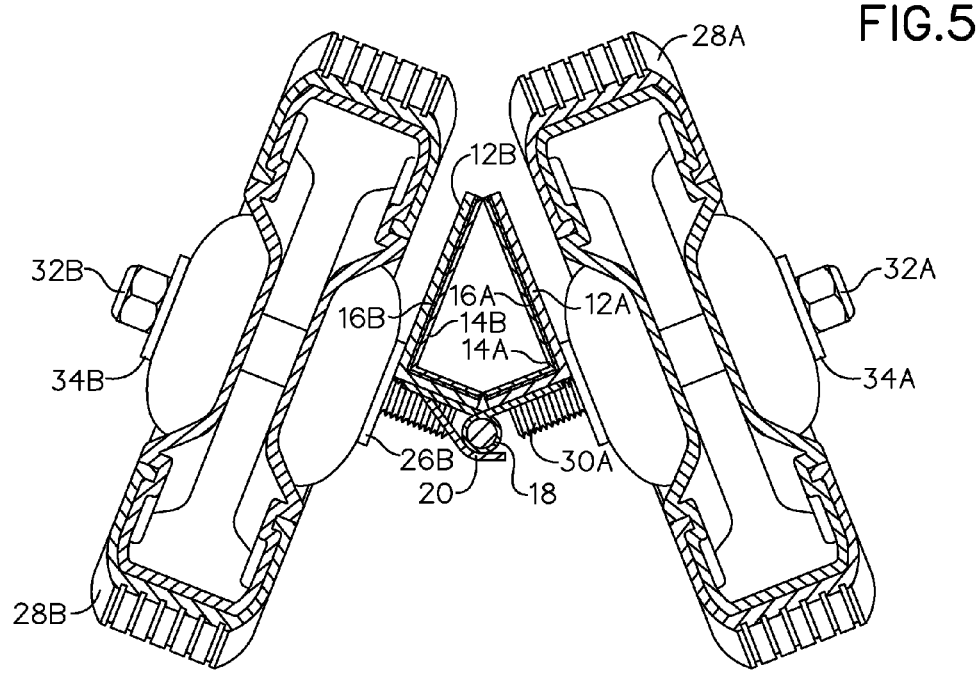
FIG. 6 is a section view of an embodiment of the invention, taken along line 6-6 in FIG. 2.
Figure 7:
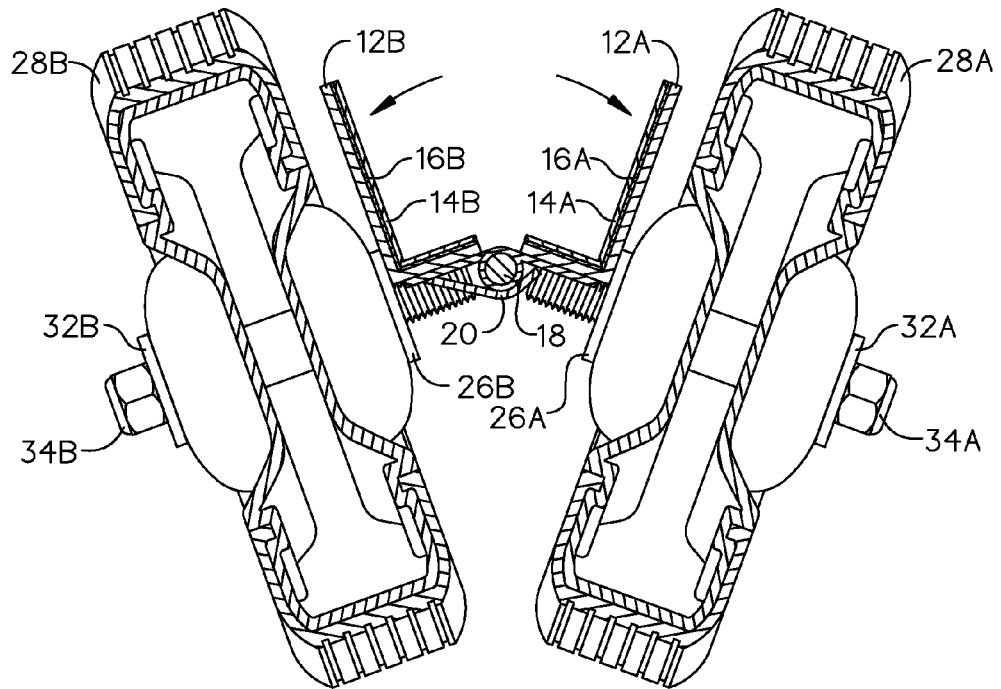
FIG. 7 is a section view of an embodiment of the invention, illustrating the opening of the supports.
Figure 8:
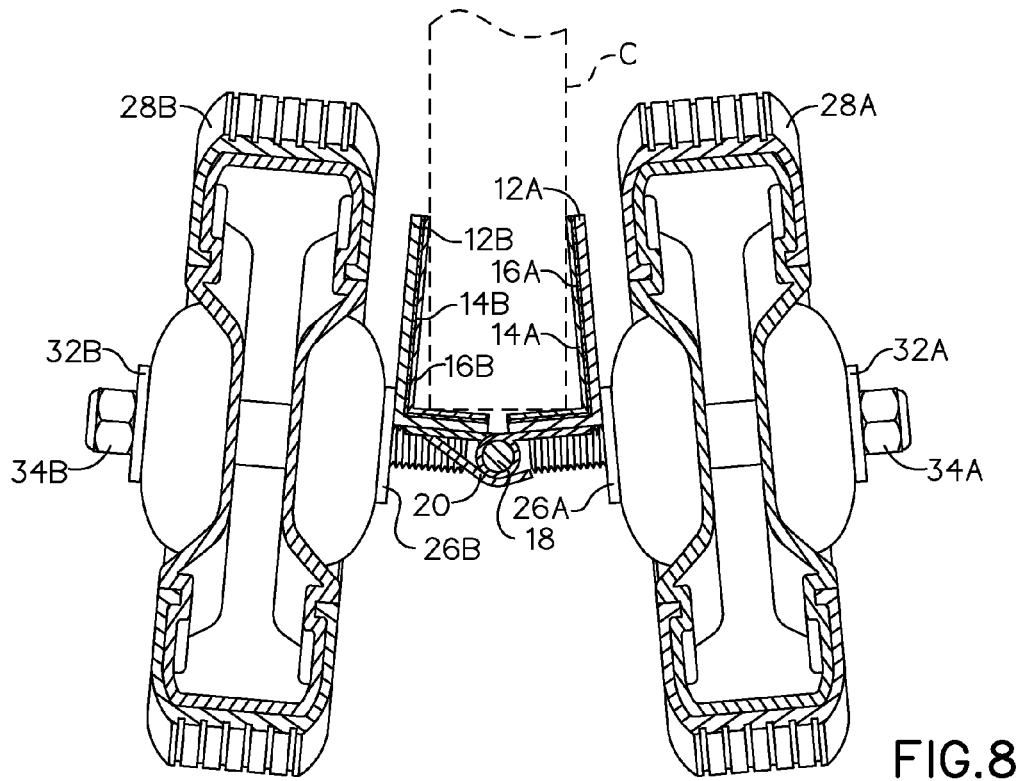
FIG. 8 is a section view of an embodiment of the invention, illustrating the clamping of the supports onto the cargo.

Turning to FIG. 5 and FIG. 6, in a first mode of operation, hinge 20 has collapsed such that a first upper surface on first pad 14A is immediately adjacent to a second upper surface on second pad 14B. FIG. 7 shows a second mode of operation where hinge 20 has opened such that the first upper surface on first pad 14A is distant from the second upper surface on second pad 14B. FIG. 8 shows a third mode of operation where cargo C is placed on first L-shaped support 12A and second L-shaped support 12B such that first L-shaped support 12A and second L-shaped support 12B contact three sides of cargo C.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A transport dolly configured to move cargo; the transport dolly comprising:

a first L-shaped support and a second L-shaped support attached to a hinge; wherein the first L-shaped support and a second L-shaped support are facing inward toward a barrel on the hinge;

a first support washer directly attached to an outer surface of the first L-shaped support;

a first wheel assembly attached to the first L-shaped support with a first axle bolt through the first support washer terminating beneath the first L-shaped support; wherein a first L-shaped support bottom rests on the first axel bolt;

a second support washer directly attached to an outer surface of the second L-shaped support;

a second wheel assembly attached to the second L-shaped support with a second axle bolt through the second support washer terminating beneath the outer surface of the second L-shaped support; wherein a second L-shaped support bottom rests on the second axel bolt;

a handle attached to the first L-shaped support;

wherein a first mode of operation, the hinge is collapsed with the handle such that a first upper surface on the first L-shaped support is immediately adjacent to a second upper surface on the second L-shaped support;

wherein a second mode of operation where the hinge is opened with the handle such that the first upper surface is distant from the second upper surface;

wherein a third mode of operation where the cargo is placed on first L-shaped support and the second L-shaped support such that the first L-shaped support and the second L-shaped support contact three sides of the cargo and the transport dolly is maneuvered with the handle.

2. The transport dolly of claim 1, further comprising:

a first pad mechanically coupled to the first L-shaped support with a first pad backing wherein the first pad increases a first coefficient of friction between the cargo and the first L-shaped support; and a second pad mechanically coupled to the second L-shaped support with a second pad backing wherein the second pad increases a second coefficient of friction between the cargo and the second L-shaped support.

3. The transport dolly of claim 2, wherein the first wheel assembly further comprises:

a first wheel, mechanically coupled to the first axel bolt;

wherein the first axel bolt is further secured to a the first wheel with a first axel washer and a first lock nut;

wherein the second wheel assembly further comprises:

a second wheel, mechanically coupled to the second axel bolt;

wherein the second axel bolt is further secured to a second wheel with a second axel washer and a second lock nut.

\* \* \* \* \*